United States Patent
Murakami et al.

(10) Patent No.: US 11,758,179 B2
(45) Date of Patent: *Sep. 12, 2023

(54) IMAGE ENCODING METHOD, IMAGE ENCODING DEVICE, IMAGE DECODING METHOD, AND IMAGE DECODING DEVICE

(71) Applicant: MAXELL, LTD., Kyoto (JP)

(72) Inventors: Tomokazu Murakami, Kokubunji (JP); Toru Yokoyama, Sagamihara (JP)

(73) Assignee: MAXELL, LTD., Kyoto (JP)

( * ) Notice: Subject to any disclaimer, the term of this patent is extended or adjusted under 35 U.S.C. 154(b) by 19 days.

This patent is subject to a terminal disclaimer.

(21) Appl. No.: 17/672,817

(22) Filed: Feb. 16, 2022

(65) Prior Publication Data
US 2022/0174311 A1 Jun. 2, 2022

Related U.S. Application Data

(63) Continuation of application No. 16/920,871, filed on Jul. 6, 2020, now Pat. No. 11,290,741, which is a (Continued)

(30) Foreign Application Priority Data

Jan. 18, 2011 (JP) ................................. 2011-007429

(51) Int. Cl.
*H04N 19/52* (2014.01)
*H04N 19/56* (2014.01)
*H04N 19/46* (2014.01)

(52) U.S. Cl.
CPC ............. *H04N 19/52* (2014.11); *H04N 19/46* (2014.11); *H04N 19/56* (2014.11)

(58) Field of Classification Search
CPC .......... H04N 19/52; H04N 19/56; H04N 19/46
(Continued)

(56) References Cited

U.S. PATENT DOCUMENTS 5,715,008 A  2/1998 Sekiguchi et al.
5,812,197 A  9/1998 Chan et al.
(Continued)

FOREIGN PATENT DOCUMENTS

JP  2007-504760  3/2007
JP  2008-211697  9/2008
(Continued)

OTHER PUBLICATIONS

I. Amonou et al., Description of video coding technology proposal by France Telecom, NTT, NTT DOCOMO, Panasonic and Technicolor, Joint Collaborative Team on video Coding (JCT-VC) of ITU-T SG16 WP3 and ISO/IEC JTC1/SC29/WG11, 1st Meeting: Dresden, DE, Apr. 15-23, 2010.
(Continued)

*Primary Examiner* — Tung T Vo
(74) *Attorney, Agent, or Firm* — Mattingly & Malur, PC

(57) ABSTRACT

For the purpose of providing an image encoding technique for reducing the amount of codes, in inter prediction in which motion search is performed by using a block obtained by dividing an input image and a reference image, the motion vector of the block is predicted by selecting from the motion vectors of the surrounding blocks. Further, in the method of calculating a differential vector and then performing encoding, the number or positions of candidate blocks from which a prediction vector is selected are changed block by block or frame by frame and thereby adaptive and efficient video image compression is performed.

2 Claims, 10 Drawing Sheets

Related U.S. Application Data continuation of application No. 16/291,234, filed on Mar. 4, 2019, now Pat. No. 10,743,020, which is a continuation of application No. 15/653,793, filed on Jul. 19, 2017, now Pat. No. 10,271,065, which is a continuation of application No. 13/988,819, filed as application No. PCT/JP2012/000193 on Jan. 16, 2012, now Pat. No. 9,781,415.

(58) Field of Classification Search
USPC .................................................. 375/240.16
See application file for complete search history.

(56) References Cited

U.S. PATENT DOCUMENTS

| | | | |
|---|---|---|---|
| 8,036,495 B2 | 10/2011 | Takeshima | |
| 8,606,026 B2 | 12/2013 | Ueda | |
| 8,649,434 B2 | 2/2014 | Takahashi | |
| 8,693,546 B2 | 4/2014 | Takahashi | |
| 9,538,181 B2 | 1/2017 | Shiodera | |
| 9,591,305 B2 | 3/2017 | Kazui | |
| 9,781,415 B2 | 10/2017 | Murakami | |
| 9,854,265 B2 | 12/2017 | Takahashi | |
| 10,271,065 B2 | 4/2019 | Murakami | |
| 10,743,020 B2 | 8/2020 | Murakami | |
| 2006/0245497 A1 | 11/2006 | Tourapis et al. | |
| 2007/0030911 A1 | 2/2007 | Yoon | |
| 2007/0064798 A1 | 3/2007 | Paniconi et al. | |
| 2007/0064802 A1 | 3/2007 | Paniconi et al. | |
| 2007/0064804 A1 | 3/2007 | Paniconi et al. | |
| 2007/0064806 A1 | 3/2007 | Paniconi et al. | |
| 2007/0064807 A1 | 3/2007 | Paniconi et al. | |
| 2007/0065025 A1 | 3/2007 | Paniconi et al. | |
| 2008/0151677 A1 | 6/2008 | Sato et al. | |
| 2008/0159636 A1 | 7/2008 | Maruyama et al. | |
| 2010/0020241 A1 | 1/2010 | Takeshima | |
| 2010/0220215 A1 | 9/2010 | Rubinstein | |
| 2010/0284469 A1 | 11/2010 | Sato et al. | |
| 2011/0103486 A1 | 5/2011 | Sato | |
| 2011/0142133 A1 | 6/2011 | Takahashi | |
| 2011/0164684 A1 | 7/2011 | Sato | |
| 2011/0176741 A1 | 7/2011 | Sato | |
| 2011/0249749 A1 | 10/2011 | Takahashi | |
| 2012/0275717 A1 | 11/2012 | Ueda | |
| 2013/0128981 A1 | 5/2013 | Kazui | |
| 2014/0146888 A1 | 5/2014 | Takahashi | |
| 2014/0177725 A1 | 6/2014 | Shiodera | |
| 2017/0099497 A1 | 4/2017 | Takahashi | |
| 2018/0084273 A1 | 3/2018 | Takahashi | |

FOREIGN PATENT DOCUMENTS

| | | |
|---|---|---|
| WO | 2005/027497 | 3/2005 |
| WO | 2009/093672 | 7/2009 |

OTHER PUBLICATIONS

Frank Bossen, et al., Simplified motion vector coding method, Joint Collaborative Team on Video Coding (JCT-VC) of ITU-T SG16 WP3 and ISO/IEC JTC1/SC29/WG11, 2nd Meeting: Geneva, CH, Jul. 21-28, 2010.

Test Model under Consideration, Joint Collaborative Team on Video Coding (JCT-VC) of ITU-T SG16 WP3 and ISO/IEC JTC1/SC29/WG11, 2nd Meeting: Geneva, Ch, Jul. 21-18, 2010.

[FIG. 1]
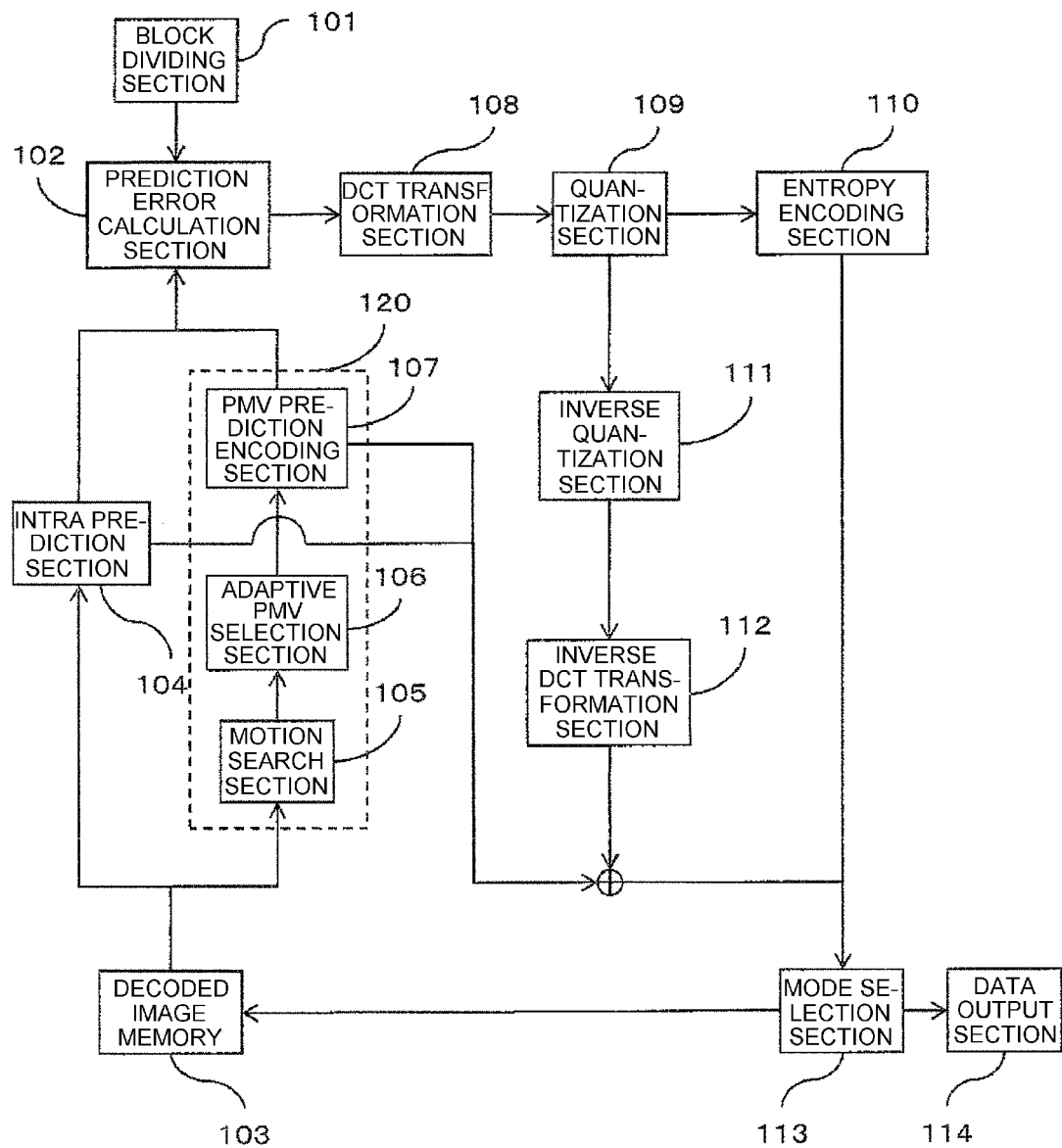

[FIG. 2]
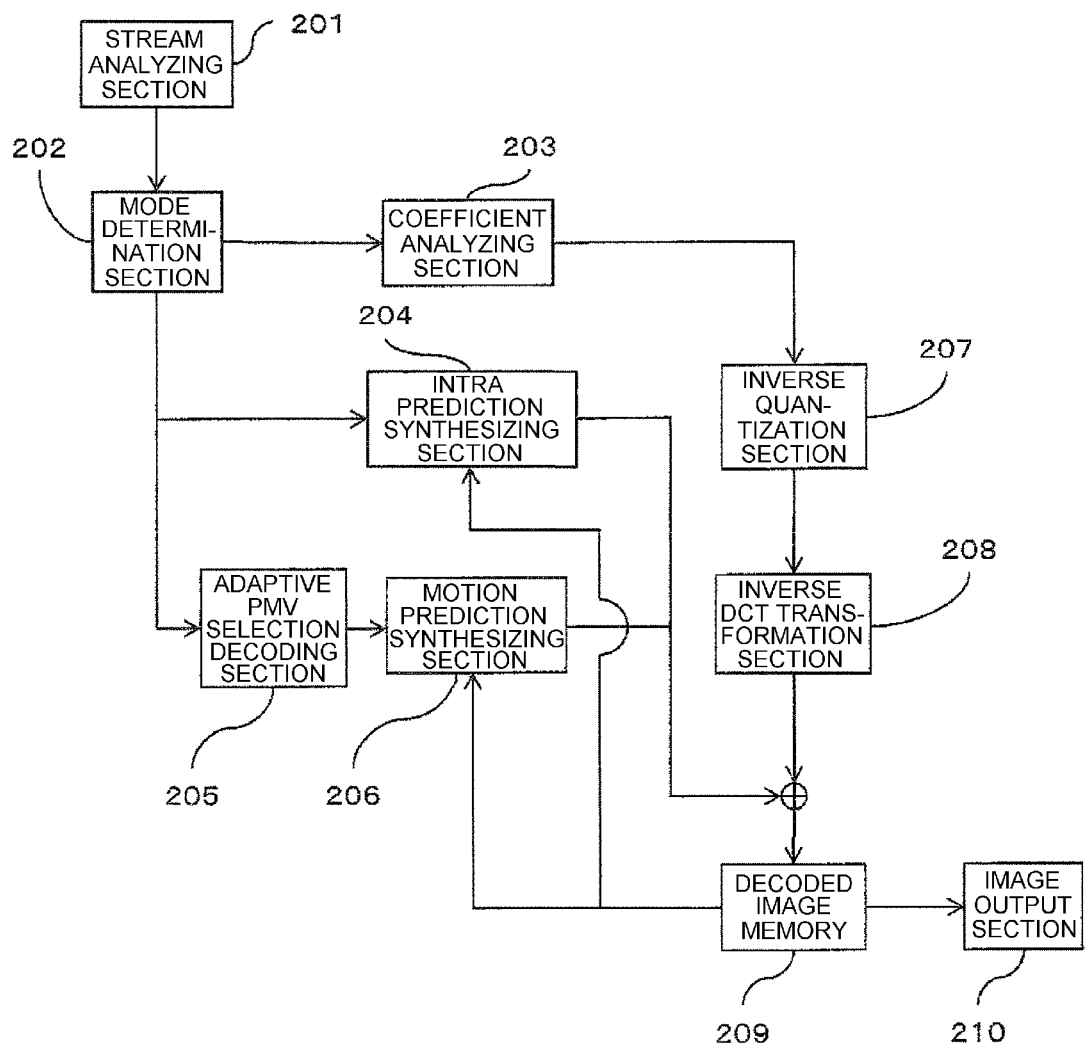

[FIG. 3]
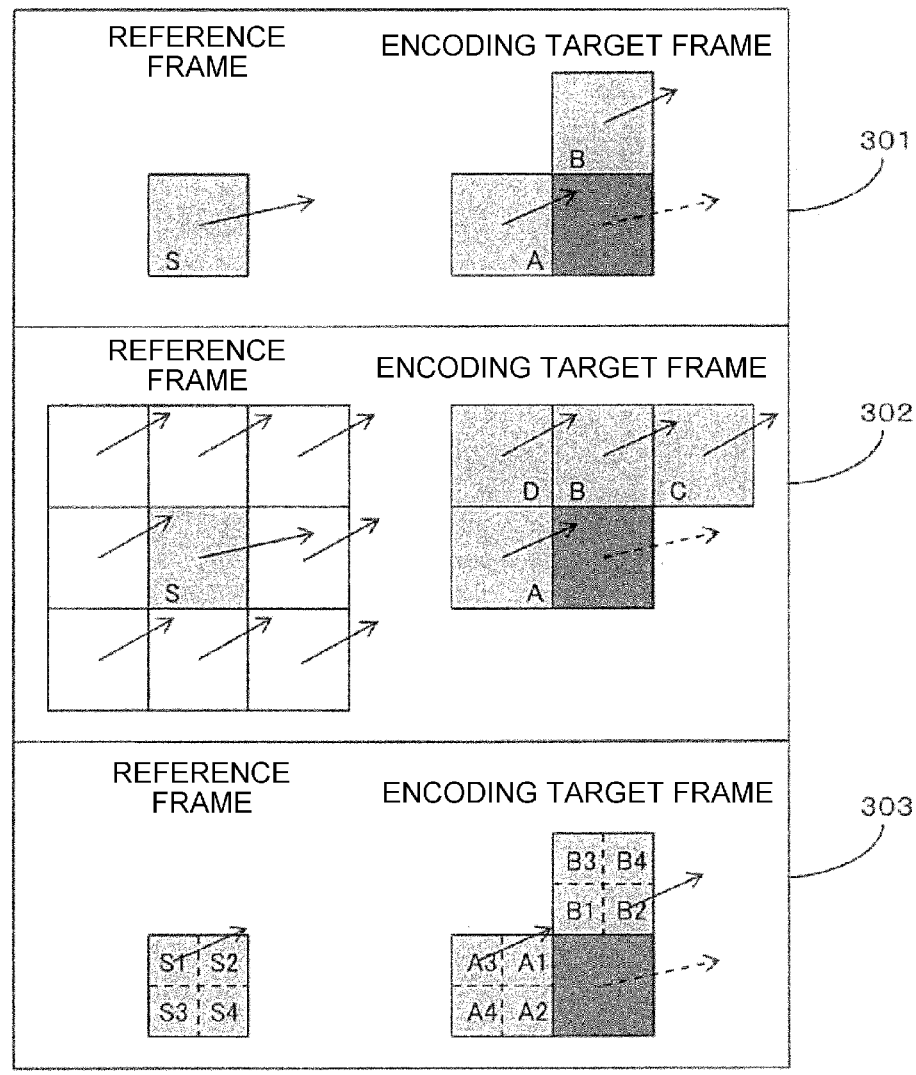

[FIG. 4]
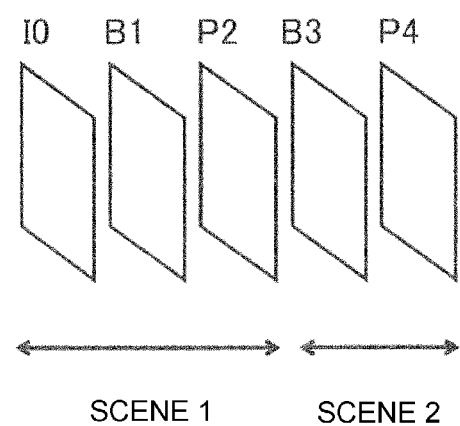

[FIG. 5]
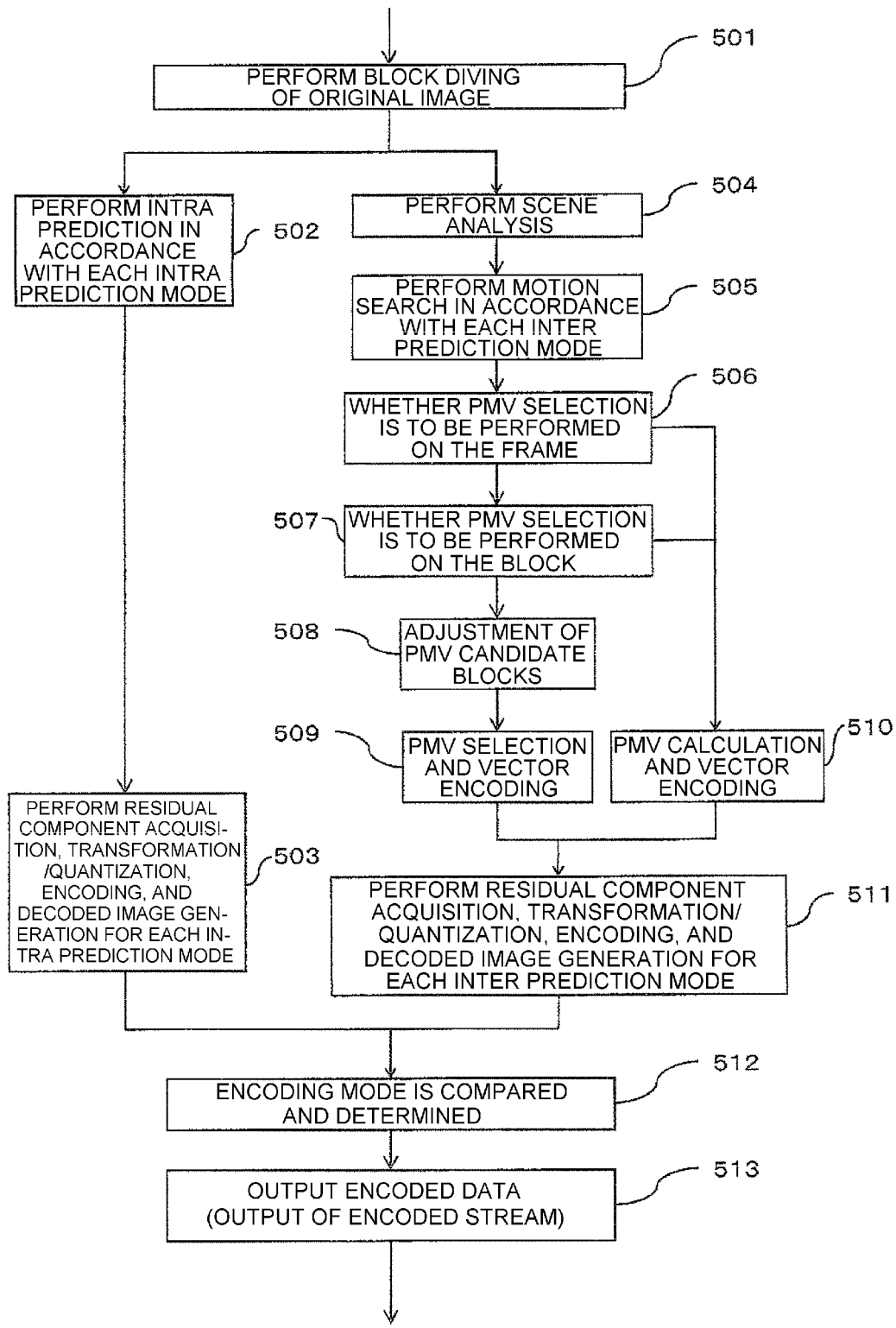

[FIG. 6]
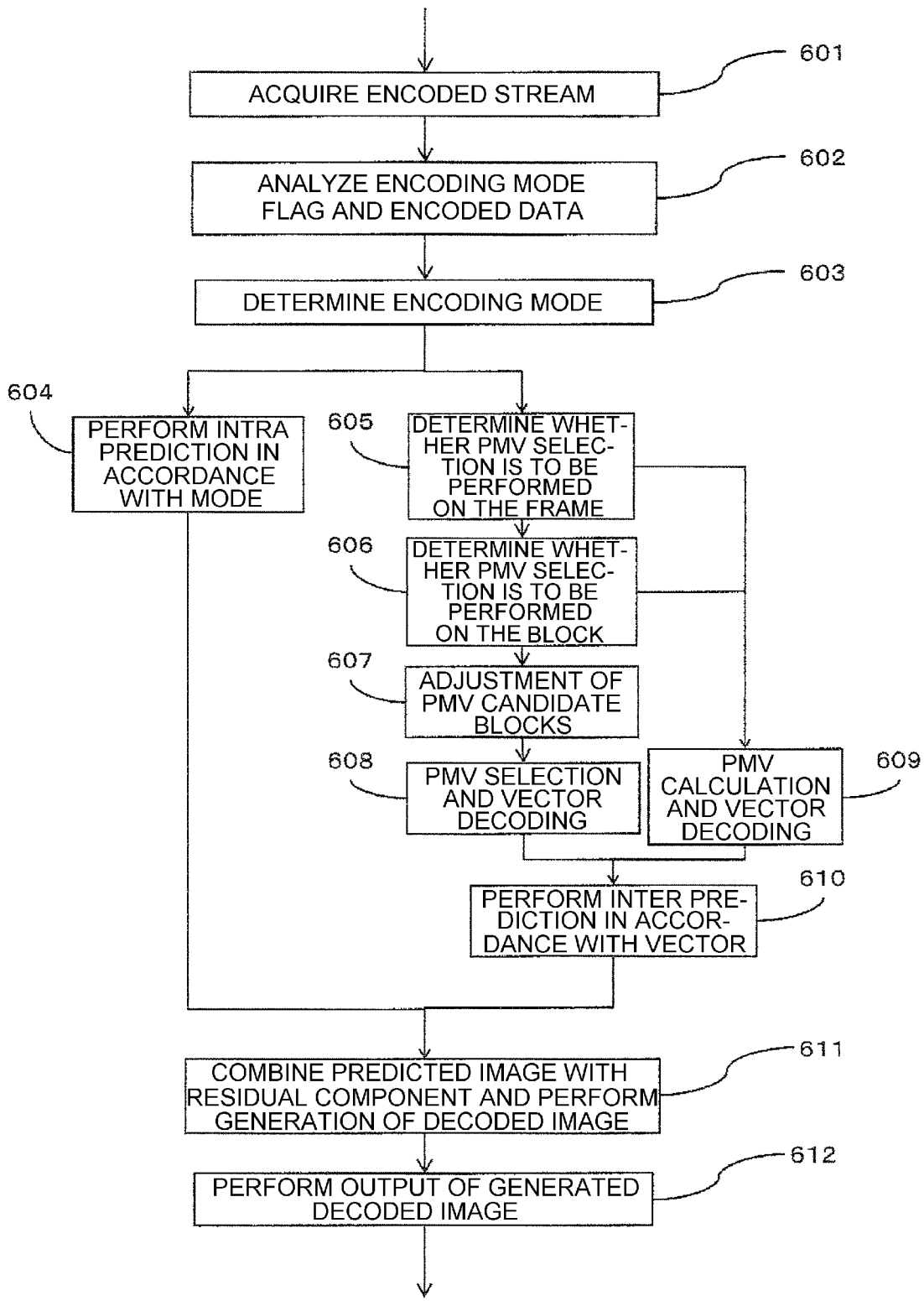

[FIG. 7]
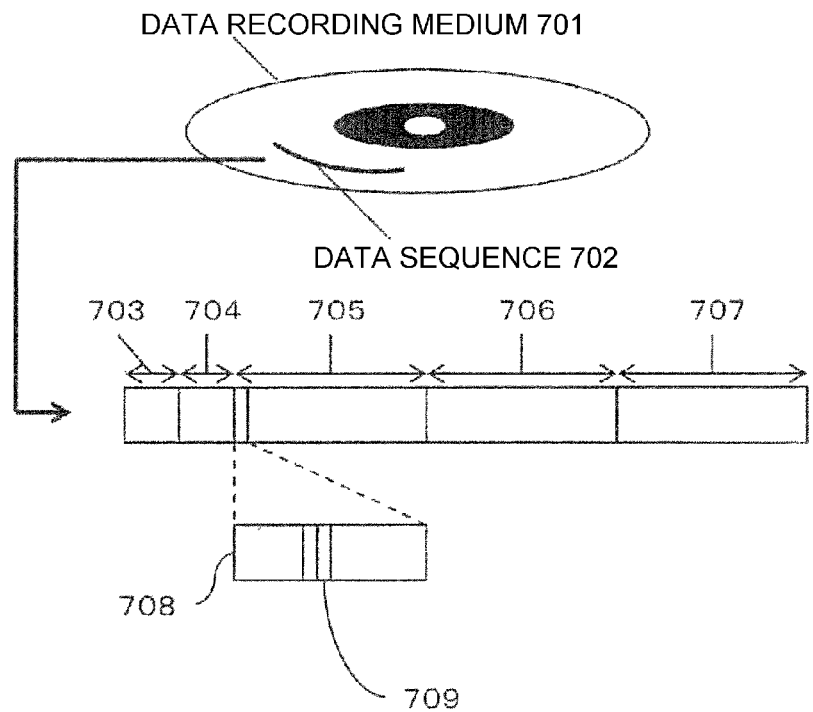
[FIG. 8]
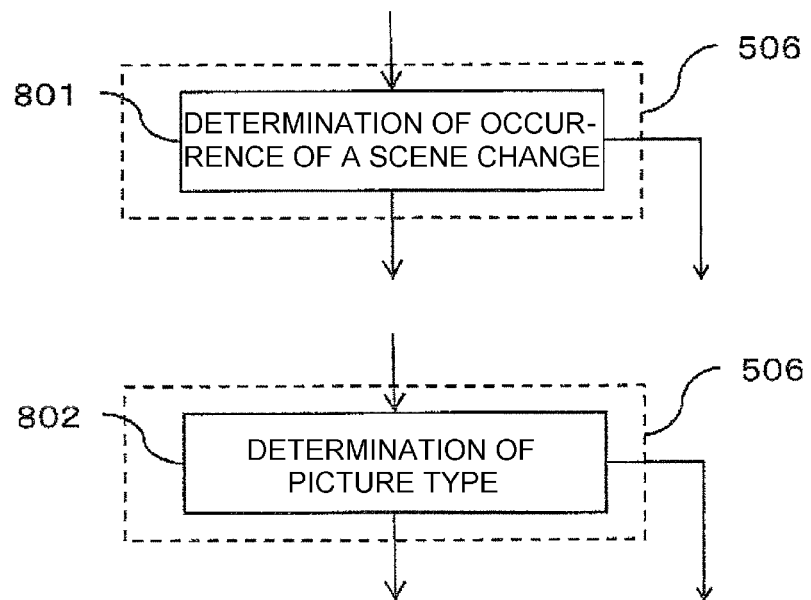

[FIG. 9]
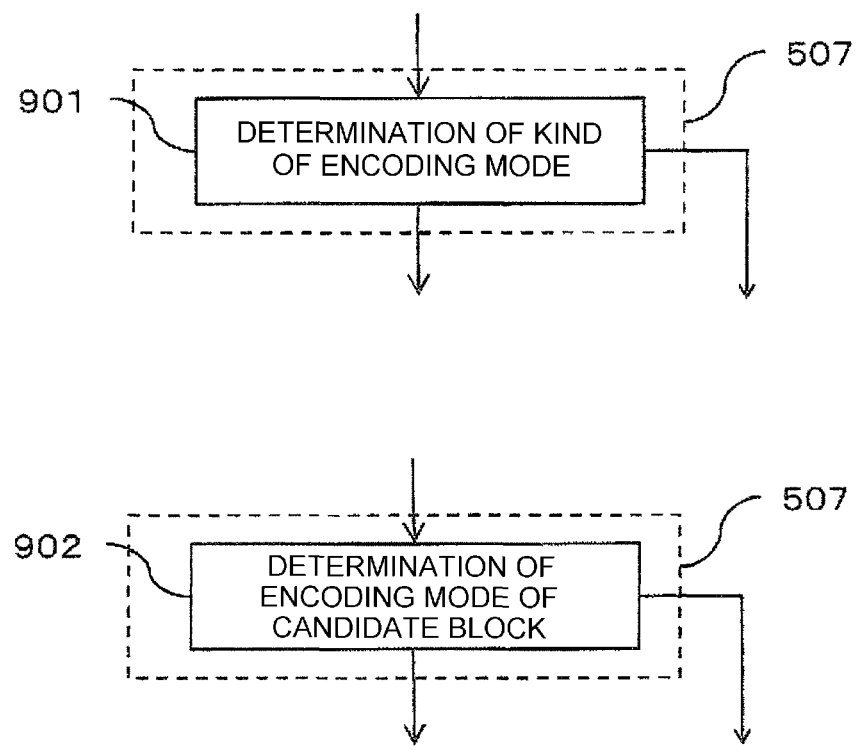

[FIG. 10]
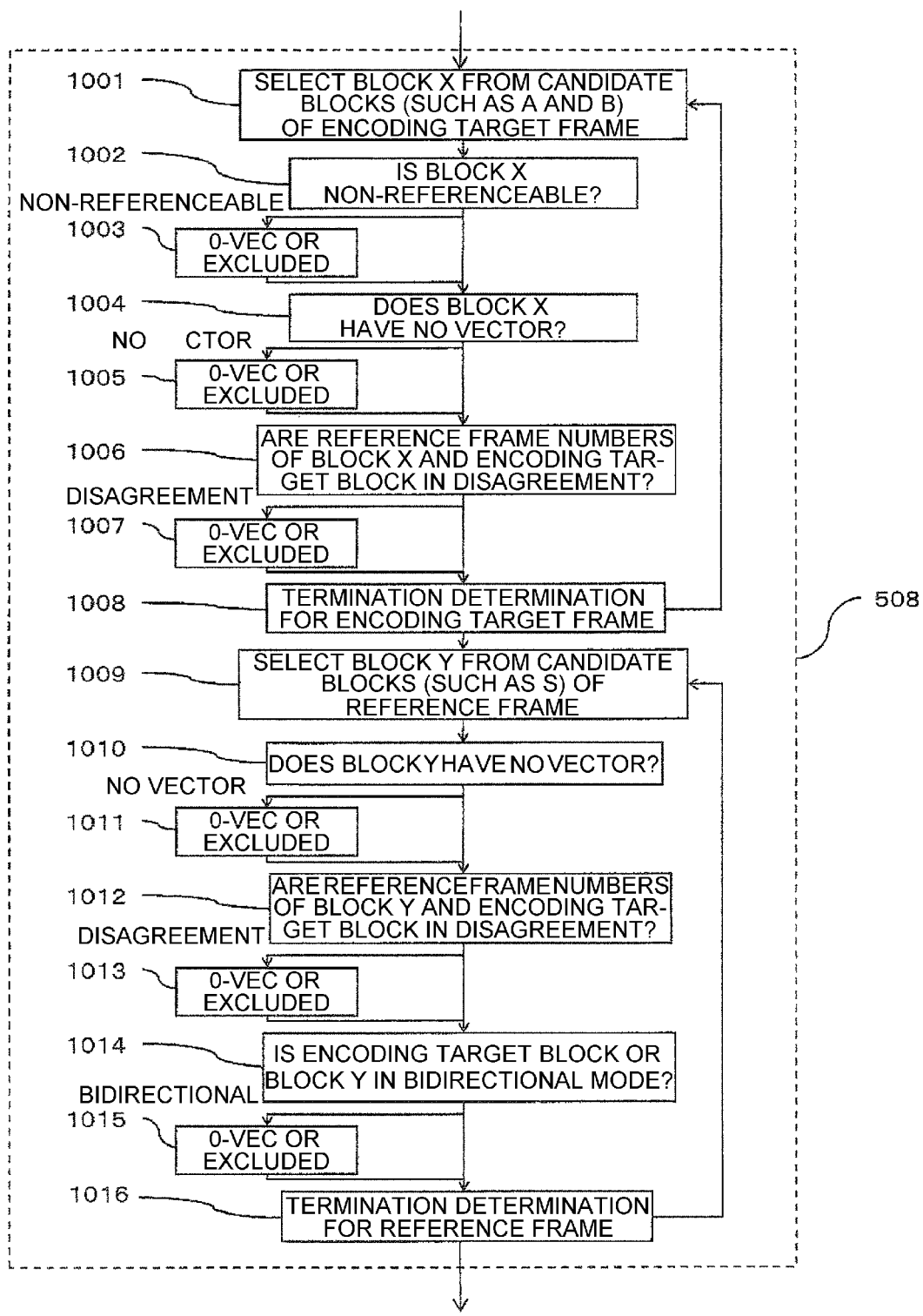

[FIG. 11]

CANDIDATE BLOCK NUMBER
OF PRECEDING BLOCK: P
NUMBER OF CANDIDATE BLOCKS: N
CANDIDATE BLOCK NUMBER: 0 TO N-1

| CODE | | CANDIDATE BLOCK NUMBER TO BE SELECTED |
|---|---|---|
| 0 | | $P$ |
| 1 | 0 | $(P+1)\%N$ |
| 1 | 1 | $(P+2)\%N$ |

CANDIDATE BLOCK NUMBER
OF PRECEDING BLOCK: P
CANDIDATE BLOCK NUMBER
OF PRESENT BLOCK: X
NUMBER OF CANDIDATE BLOCKS: N
CANDIDATE BLOCK NUMBER: 0 TO N-1

$$C = \begin{cases} 0 & X = P \\ (1 << \log_2(N-1)) + (X-P-1)\%N & \text{others} \end{cases}$$

IMAGE ENCODING METHOD, IMAGE ENCODING DEVICE, IMAGE DECODING METHOD, AND IMAGE DECODING DEVICE

TECHNICAL FIELD

The present invention relates to: an image encoding method and an image encoding device for encoding an image; and an image decoding method and an image decoding device for decoding encoded image data.

BACKGROUND ART

As techniques of converting image and speech information into digital data and then recording and transmitting the data, the H. 264/AVC (Advanced Video Coding) standard and the like have so far been set forth. For the purpose of realizing a compression ratio exceeding this, ISO/IEC MPEG and ITU-T VCEG have established JCT-VC (Joint Collaborative Team on Video Coding) and started discussion for a next-generation method named HEVC (High Efficiency Video Coding).

As a technical candidate for the HEVC, a method called Motion Vector Competition has been proposed. The method is a proposal of a prediction vector selection method in a motion prediction mode in an encoding target macro block. In the H. 264/AVC, a prediction vector has been acquired from the motion vectors owned by already-encoded macro blocks located at up, left, and upper right positions relative to the encoding target macro block by performing median arithmetic operation on the X-direction component and the Y-direction component.

On the other hand, in the motion vector competition, the motion vectors of up and left and of the nearest reference frame at the same position as the encoding target macro block are compared with each other, and then a vector closest to the motion vector of the encoding target macro block is selected as a prediction vector and transmitted as a flag.

CITATION LIST

Non-Patent Literature

NPL 1: I. Amonou, et. al. "Description of video coding technology proposal by France Telecom, NTT, NTT DOCOMO, Panasonic and Technicolor", Doc. JCTVC-A114, Joint Collaborative Team on Video Coding (JCT-VC), April 2010.

SUMMARY OF INVENTION

Technical Problem

Nevertheless, in the motion vector competition method, a flag is transmitted. Thus, when the result of median arithmetic operation is equal to the prediction vector, an increase arises in the amount of codes by the amount of the flag.

Further, the method is effective not for all encoding modes using a motion vector.

Further, in a case that the block referred to does not have a motion vector, the processing for the outside of the frame region and the method of describing the flag are not efficient.

Further, in this method, two are selected from three candidates and then the flag is recorded. Thus, the candidate blocks are selected only from a small region. This causes the problems of a large prediction error, a large amount of codes, and a low encoding efficiency.

The present invention has been devised in view of the above-mentioned problems. An object of the present invention is to provide an image coding technique and an image decoding technique that employ suitable motion prediction so as to realize a high encoding efficiency.

Solution to Problem

The present application includes various kinds of means of resolving the above-mentioned problems. One of them is as follows.

An image encoding device for encoding an input image, including: a motion search section for performing motion search by using an encoding target block obtained by dividing the input image and a reference image; an adaptive PMV selection section for predicting a motion vector of the encoding target block from motion vectors of candidate blocks composed of a part or all of blocks located in the surroundings of the encoding target block, and thereby generating a prediction motion vector; and a PMV prediction encoding section for calculating a differential vector from the motion vector of the encoding block and the prediction motion vector and then performing encoding, wherein the adaptive PMV selection section includes first means of changing the number or positions of the candidate blocks to be used or alternatively setting into a zero vector the motion vector of the candidate block to be used.

Advantageous Effects

According to the present invention, the encoding efficiency can be improved.

BRIEF DESCRIPTION OF DRAWINGS

FIG. 1 is a block diagram of an image encoding device according to Embodiment 1.

FIG. 2 is a block diagram of an image decoding device according to Embodiment 2.

FIG. 3 is an explanation diagram of candidate blocks in which a motion vector is selected as a PMV (prediction motion vector) according to Embodiment 1.

FIG. 4 is an explanation diagram concerning outlines of scene analysis according to Embodiment 1.

FIG. 5 is an image encoding flow chart employed in an image encoding device according to Embodiment 1.

FIG. 6 is a flowchart of an image decoding method according to Embodiment 2.

FIG. 7 is an explanation diagram of a data recording medium according to Embodiment 3.

FIG. 8 is a diagram showing a frame-by-frame PMV selection determination flow in an adaptive PMV selection section according to Embodiment 1.

FIG. 9 is a diagram showing a block-by-block PMV selection determination flow in an adaptive PMV selection section according to Embodiment 1.

FIG. 10 is a diagram showing an adjustment flow for candidate blocks in which PMV selection is performed block by block in an adaptive PMV selection section according to Embodiment 1.

FIG. 11 is a diagram showing an example of the method of describing as a flag a selected vector according to Embodiment 1.

DESCRIPTION OF EMBODIMENTS

Embodiments are described below with reference to the drawings.

Further, in the individual drawings, components designated by the same numeral have the same function.

Further, the expression "motion vector competition" in the description and the drawings of the present specification indicates a conventional encoding method. The expression "adaptation motion vector selection" indicates a new encoding method according to the present invention. "PMV selection" indicates that one is selected from motion vectors owned by candidate blocks and then a predicted motion vector (PMV) is generated (including situations that a median or the like is employed intact but selectively and that a new vector is generated by combining or the like a plurality of motion vectors) from the selected motion vector.

Further, "0-vec" or "zero vector" in the description and the drawings of the present specification indicates a vector whose components have zero values, or alternatively indicates conversion or setting into such a vector.

Further, "non-referenceable" in the description and the drawings of the present specification indicates that information concerning a block is not acquirable. Particular examples of this include a situation that the position of a candidate block falls outside a screen region. On the contrary, "referenceable" indicates that information concerning a block is acquirable.

Further, "information of a block" in the description and the drawings of the present specification includes a vector and a reference frame number.

Further, the expression "residual component" in the description and the drawings of the present specification includes also a meaning similar to a "prediction error".

Further, the expression "region" in the description and the drawings of the present specification includes also a meaning similar to an "image".

Further, the expression "to transmit together with a flag" in the description and the drawings of the present specification includes also the meaning "to transmit in a state of being contained in a flag".

Further, the expression "encoding mode" in the description and the drawings of the present specification includes a combination of the type of intra prediction/inter prediction and a block size to be applied.

Embodiment 1

First, a first embodiment is described below with reference to the drawings.

FIG. 1 shows a block diagram of an image encoding device according to Embodiment 1.

The image encoding device includes a block dividing section 101, a prediction error calculation section 102, an intra prediction section 104, a PMV prediction encoding section 107, an adaptive PMV selection section 106, a motion search section 105, a decoded image memory 103, a DCT transformation section 108, a quantization section 109, an entropy encoding section 110, an inverse quantization section 111, an inverse DCT transformation section 112, a mode selection section 113, and a data output section 114.

The operation of the individual components of the image encoding device is described below in detail.

Here, the operation of the individual components of the image encoding device may be, for example, of autonomous operation of the individual components as described below. Further, the operation may be implemented by cooperation between a control section of a computer and software stored in a storage section of the computer.

First, the block dividing section 101 receives an original image serving as an encoding target and then divides this into blocks serving as units of encoding. The size of a block obtained here by dividing is of a power of 2 such as 16×16 pixels named a Coding Unit (CU) or a Prediction Unit (PU) (a block of m pixels×n pixels, m, n=power of 2, e.g., 128×128, 64×64, 32×32, 16×16, 16×8, 8×16, 8×8, 4×4). However, the size is variable, and blocks of mutually different sizes may be adjacent to each other. The following description is given for an example that blocks of the same size succeed to each other. Then, the method of vector selection in the case of mutually different sizes is described separately.

The prediction error calculation section 102 acquires a difference between a generated predicted image and the original image, and thereby calculates and outputs a residual component. In general, prediction methods are intra (intra-frame) prediction and inter (inter-frame) prediction. Intra prediction is performed by the intra prediction section 104. Inter prediction is performed by an inter prediction section 120 constructed from the PMV prediction encoding section 107, the adaptive PMV selection section 106, and the motion search section 105. Intra prediction uses information of the same frame having been encoded before the encoding target block. Inter prediction uses information of a frame that has been encoded before the encoding target frame and that is positioned before or after in terms of reproduction time. These are stored in the decoded image memory 103.

Here, the intra prediction section 104, the inter prediction section, and the decoded image memory 103 have been in a singular number for the purpose of description. However, these may be provided respectively for each encoding mode and each frame.

The intra prediction section 104, by using the information of the same frame encoded before the encoding target block, predicts the pixels of the encoding target block. The employed method of intra prediction may be of an existing method.

In the inter prediction section 120, first, the motion search section 105 searches for a motion vector (MV) by using a reference frame and the encoding target block stored in the decoded image memory 103. The precision of the pixel may be an integer or a decimal fraction. A ¼-pixel precision is preferable by interpolation of a reference frame with a filter. Instead, ½ or ⅛ may be employed. In the present embodiment, the motion searching method is an existing one.

Then, the adaptive PMV selection section 106, by using the information of the surrounding blocks located in the same frame of the encoding target block and the blocks located at the same position of the reference frame and in the surroundings, a PMV is selected adaptively by time and spatial distinction. In the present embodiment, both of time distinction and spatial distinction are employed, and then adaptive distinction is performed on a PMV. However, any one of these may be employed. Details of the method, surrounding blocks serving as candidates, and the method of PMV selection are described later.

An example of candidate blocks from which a PMV is selected is described below with reference to FIG. 3. In an existing motion vector competition method, as shown in 301, the left block (A) and the upper block (B) located in the same encoding target frame as the encoding target block and the block (Co-located Block) (S) located at the same position as the encoding target block of the nearest forward reference frame (L0[0]) are adopted as candidates. Then, these are arranged sequentially like A, B, and S. When identical vectors are included in these, it is excluded from the candidates. Then, one closest to the vector of the encoding target block is selected and indicated by a flag.

Here, the nearest forward reference frame has been adopted in the present embodiment. However, a backward reference frame may be adopted as candidates by flag as long as it is an already-encoded frame. Further, instead of one frame, a plurality of encoded frames may be referred to.

On the other hand, in the adaptation motion vector selection method employed in the adaptive PMV selection section of the present embodiment, as shown in 302, in addition to the left and the upper blocks of the encoding target block, the upper right (C) and the upper left (D) are also included in the candidates. Further, the surrounding blocks of the block S of the reference frame may also be included in the candidates. That is, (a) the number, (b) the spatial positions (blocks in the frame), and (c) the time positions (blocks in another frame) of candidate blocks used in the adaptive PMV selection section are changeable. Details of the method of selection are described later.

Further, in the adaptation motion vector selection method of the present embodiment, as shown in 303, in a case that the candidate blocks have mutually different sizes and that the block located at a position to be first referred to does not have a motion vector or is non-referenceable, it is sequentially checked whether nearby blocks have a motion vector. Then, when it is usable, it is adopted as a candidate of PMV selection. Specifically, in 303, when B1 is non-referenceable, B2, B3, and B4 are checked sequentially. Similarly, when A1 is non-referenceable, A2, A3, and A4 are checked. When S1 is non-referenceable, S2, S3, and S4 are checked. Scanning may be performed toward a near block starting at the upper left of the encoding target frame. In the case of blocks B, the order is from left to right and from down to up. In the case of blocks A, the order is from up to down and from right to left. In the case of blocks S, the order is of ordinary raster scan, that is, from left to right and from up to down.

Then, the PMV prediction encoding section 107 subtracts the PMV from the MV so as to calculate a differential vector (Differential Motion Vector: DMV), and then encodes this. Further, by using the MV, motion prediction is performed from the reference frame so that a prediction block is generated.

The DCT transformation section 108 performs DCT transformation on the residual component inputted from the prediction error calculation section 102, and thereby converts the residual component into coefficients. Then, the transform coefficients are transmitted to the quantization section 109 and then quantized. The quantized coefficients are transmitted to the entropy encoding section 110 and then undergo information compression using a variable length code or the like in a fixed sequence. The data is transmitted to the mode selection section 113. On the other hand, the quantized coefficients are transmitted also to the inverse quantization section 111 so as to be returned to the transform coefficients by inverse quantization, and further restored to the residual component by the inverse DCT transformation section 112. Together with information from the intra prediction section 104 and a series of the inter prediction sections, the residual component is returned to a decoded image and then stored into the decoded image memory 103. The decoded image is inputted to the mode selection section 113 and then used for mode selection.

Then, on the basis of information concerning a plurality of encoding modes, the mode selection section 113 selects a mode that realizes the highest encoding efficiency for the block. For each encoding mode, an error (encoding error) between the original image and the decoded image and the amount of codes generated when the encoding mode is adopted are calculated, and then a suitable encoding mode is selected on the basis of the relation of the two. For example, as the method of selecting an encoding mode that realizes the highest encoding efficiency, an existing method such as the Rate-Distortion optimization method may be employed. In this method, the amount of codes and the encoding error of the decoded image from the original are calculated for each macro block for all modes, and then the most satisfactory mode is selected in accordance with a cost calculation formula.

Finally, the data output section 114 outputs the selected codes so that an encoded stream is generated and encoding of an image is completed.

Next, an image encoding flow employed in the image encoding device is described below with reference to FIG. 5.

First, Step 501 is a processing that an original image serving as an encoding target is inputted from the decoded image memory 103 and then divided into blocks. Here, the size of each block is variable. That is, the above-mentioned CU or PU may be employed. The Step 501 is executed by the block dividing section 101.

Then, at Step 502, intra prediction is performed on the block of the original image acquired at Step 501. The employed method of intra prediction may be existing one. In accordance with the individual intra prediction modes, prediction is performed for a plurality of modes. This processing of Step 502 is executed by the intra prediction section 104.

Then, at Step 503, a residual component is acquired for the pixels of the encoding block having undergone intra prediction, and then DCT transformation processing, quantization processing, and entropy encoding processing are performed on the residual component so that encoded data is calculated. Further, entropy decoding processing, inverse quantization, and inverse DCT transformation processing are performed on the encoded data so that a decoded image is generated. Then, the encoded data and the decoded image are outputted. Each processing of Step 503 is performed by the prediction error calculation section 102, the DCT transformation section 108, the quantization section 109, and the entropy encoding section 110 in this order.

At Step 504, scene analysis is performed. Outlines of scene analysis are described below with reference to FIG. 4. In a video image sequence, in some cases, even within one GOP (Group of Picture: a group of frames with respect to prediction in the time direction), a change arises in the feature of the image. For example, a scene change in a movie or a drama or alternatively switching of cameras in a live telecast could occur. FIG. 4 shows a situation that switching of a scene 1 and a scene 2 occurs between a frame P2 and a frame B3. Here, in an existing motion vector competition method, the frame P4 or B3 refers to the motion vector of the P2 frame. Nevertheless, since the scenes are different from each other, an effective motion vector is not acquired. Thus, in the present embodiment, a plurality of decoded images are analyzed so that a scene change is found without using a flag. Alternatively, the position of a scene change detected as a result of scene analysis performed by the encoder side may be notified to the decoder by using a flag, and then when the encoding target frame and the reference frame belong to mutually different frames, this block is not adopted as a candidate block of PMV. Such processing of scene analysis may be performed frame by frame or alternatively block by block. Although not shown as a distinct block, this processing is executed before the motion search section 105 in the inside of the inter prediction section 120 performs motion search.

Then, at Step 505, motion search is performed for each inter prediction mode. Inter prediction modes include a motion prediction mode for mutually different block sizes, a Skip mode, and a Direct mode. The employed method of motion search may be of an existing method. This Step 505 is executed by the motion search section 105 in the inter prediction section 120.

Then, at Step 506, it is determined whether PMV selection is to be performed frame by frame. When PMV selection is not to be performed, the procedure goes to Step 510. Otherwise, the procedure goes to Step 507. Then, at Step 507, it is determined whether PMV selection is to be performed block by block. When PMV selection is not to be performed, the procedure goes to Step 510. Otherwise, the procedure goes to Step 508. Further, at Step 508, adjustment of PMV candidate blocks is performed so that in accordance with a condition, it is determined which block is to be included into the candidate blocks and which block is not to be included. This processing is changeable frame by frame and block by block. This switching may be transmitted to the decoding device side by using a flag. Alternatively, the same switching condition may be held in the decoding device.

Details of frame-by-frame PMV selection determination are described below with reference to FIG. 8. At Step 801, whether a scene change or not is determined so that whether PMV selection is to be performed is determined. At this time, scene analysis processing may be performed by the decoder side as described above so that whether PMV selection is to be performed may be determined without transmission of a flag. Alternatively, determination performed by the encoder side may be notified to the decoder side by using a flag so that determination may be achieved. When PMV selection is not to be performed, a particular method to be employed is determined in advance like the method of calculating a PMV by median arithmetic operation and the method of adopting as a PMV the vector of a left or upper block having been set forth in advance.

Further, in another example, at Step 802, a picture type is determined so that whether PMV selection is to be performed is determined. At this time, for example, when the encoding target frame is a P picture, motion vector prediction by PMV selection is performed. Otherwise, another means is adopted like median arithmetic operation. A B picture may be employed in place of the P picture. A flag may be provided for discriminating which kind of determination is to be performed for which type picture.

Details of block-by-block PMV selection determination are described below with reference to FIG. 9. At Step 901, the type of encoding mode of the encoding target block is distinguished so that whether PMV selection is to be performed is determined. For example, PMV selection may be performed only in the case of a particular block size. Alternatively, PMV selection may not be applied in a Skip mode or a Direct mode.

Further, in another example, at Step 902, the type of encoding mode of a candidate block is distinguished so that whether PMV selection is to be performed is determined. For example, when all candidate blocks are in the intra encoding mode, PMV selection is not performed.

According to the above-mentioned methods, whether PMV selection is to be performed frame by frame or block by block is switchable.

Details of the method of adjustment of candidate blocks in which PMV selection is performed block by block are described below with reference to FIG. 10. In this processing, at the time of PMV selection, depending on the encoding mode of a candidate block, whether a candidate block has a vector, or whether a candidate block is referenceable, the block is excluded from the candidate blocks or another candidate block is added.

First, at Step 1001, from the candidate blocks of the encoding target frame, for example, from A and B in FIG. 3, one block having not yet been checked is selected. This is referred to as a block X.

Then, at Step 1002, it is checked whether the block X is referenceable. When the block is non-referenceable, the procedure goes to Step 1003. When the block is referenceable, the procedure goes to Step 1004. The term "non-referenceable" indicates a state that the information of the block is not acquirable because, for example, the block position is located outside the screen. The term "referenceable" indicates a situation that the information of the block is acquirable. The information of the block includes the vector and the reference frame number.

At Step 1003, the block X is set as a zero vector or alternatively excluded from the candidate blocks. Which operation is to be performed is determined in advance. For example, at Step 1003, the block is set as a zero vector. The "zero vector" is a vector whose individual components have the value of 0.

At Step 1004, it is checked whether the block X has a vector. Intra encoded blocks do not have a vector. When the block does not have a vector, the procedure goes to Step 1005. When the block has a vector, the procedure goes to Step 1006.

At Step 1005, the block X is set as a zero vector or alternatively excluded from the candidate blocks. Which operation is to be performed is determined in advance. For example, at Step 1005, the block is excluded from the candidate blocks.

At Step 1006, it is checked whether the reference frame numbers of the block X and the encoding target block agree with each other. For example, the encoding target block is of one-directional prediction and the block X is of bidirectional prediction, it is sufficient that either L0 or L1 is in agreement. Further, when the encoding target block is of bidirectional prediction and the block X is of one-directional prediction, disagreement is concluded. In the case of disagreement, the procedure goes to Step 1007. In the case of agreement, the procedure goes to Step 1008.

At Step 1007, the block X is set as a zero vector or alternatively excluded from the candidate blocks. Which operation is to be performed is determined in advance. For example, at Step 1007, the block is excluded from the candidate blocks.

At Step 1008, it is determined whether another candidate block to be checked is present in the encoding target frame. When another block to be checked is present, the procedure returns to Step 1001. Otherwise, the procedure goes to Step 1009.

At Step 1009, from the candidate blocks of the reference frame, for example, from S in FIG. 3, one block having not yet been checked is selected. This is referred to as a block Y.

At Step 1010, it is checked whether the block Y has a vector. Intra encoded blocks do not have a vector. When the block does not have a vector, the procedure goes to Step 1011. When the block has a vector, the procedure goes to Step 1012.

At Step 1011, the block Y is set as a zero vector or alternatively excluded from the candidate blocks. Which operation is to be performed is determined in advance. For example, at Step 1011, the block is excluded from the candidate blocks.

At Step 1012, it is checked whether the reference frame numbers of the block Y and the encoding target block agree with each other. For example, the encoding target block is of one-directional prediction and the block Y is of bidirectional prediction, it is sufficient that either L0 or L1 is in agreement. Further, when the encoding target block is of bidirectional prediction and the block Y is of one-directional prediction, disagreement is concluded. In the case of disagreement, the procedure goes to Step 1013. In the case of agreement, the procedure goes to Step 1014.

At Step 1013, the block Y is set as a zero vector or alternatively excluded from the candidate blocks. Which operation is to be performed is determined in advance. For example, at Step 1013, the block is excluded from the candidate blocks.

At Step 1014, it is checked whether the encoding target block or the block Y is in a bidirectional prediction mode. When any one is in the bidirectional prediction mode, the procedure goes to Step 1015. Otherwise, the procedure goes to Step 1016.

At Step 1015, the block Y is set as a zero vector or alternatively excluded from the candidate blocks. Which operation is to be performed is determined in advance. For example, at Step 1015, the block is excluded from the candidate blocks.

At Step 1016, it is determined whether another candidate block to be checked is present in the reference frame. When another block to be checked is present, the procedure returns to Step 1009.

Here, in correspondence to the individual conditions, at Steps 1003, 1005, 1007, 1011, 1013, and 1015, the block X or the block Y was set as a zero vector or alternatively excluded from the candidate blocks. In contrast, as a candidate block, for example, the block located at the position C or D in FIG. 3 may be added to the candidate blocks. For example, among S, A, and B, when the number of candidate blocks is 0, C and D are added to the candidate blocks. When the number of candidate blocks is 1, C is added to the candidate blocks. C, D, and other blocks may be added in advance to the candidate blocks, and then a vector may be selected from them.

For example, when the picture of L0[0] has been intra encoded, S is excluded from the candidate blocks and, instead, C may be added. Alternatively, when the block A is non-referenceable, the block C may be used.

As for whether the above-mentioned PMV selection is to be performed or as for the method of candidate block adjustment, the method having been determined in advance may be switched frame by frame or block by block by using a flag. That is, the following methods are employable.

The methods are unified into any one method.
The method is made switchable frame by frame and a selected method is indicated by a flag.
The method is made switchable block by block and a selected method is indicated by a flag.

The conditions shown in FIG. 10 are as follows. The order of determination of these may be changed.
Whether the candidate block is non-referenceable.
Whether the candidate block has a motion vector.
Whether the candidate block and the encoding target block have mutually different coding types (e.g., the candidate block is of bidirectional prediction (B prediction) and the encoding target block is of one-directional prediction (P prediction)).
Whether the reference frame numbers of the candidate block and the encoding target block agree with each other.
Whether the candidate block or the encoding target block are of bidirectional prediction.

The following methods of candidate block adjustment are employable.
The candidate block is excluded from the candidate blocks.
The vector of the candidate block is processed as a zero vector.
Another block located in the encoding target frame is added to the candidate blocks.
Another block located in the reference frame is added to the candidate blocks.
Another block shown in 303 of FIG. 3 is added to the candidate blocks.
Only when the coding types agree with each other, the processing is performed. Otherwise, the block is excluded from the candidate blocks.
Only when the reference frame numbers agree with each other, the processing is performed. Otherwise, the block is excluded from the candidate blocks.
Only when the encoding target block is of bidirectional prediction, the candidate block and its vector are selected by reference frame number of target block Then, at Step 509, a PMV is selected and then a differential vector is calculated and encoded. As the PMV, a vector nearest to the vector of the encoding target block is selected from the vectors of the candidate blocks. A vector is selected in which the smallest amount of codes is obtained when the individual components of the vector is encoded. The selected vector is transmitted as a flag. This indicates that when the candidate blocks are arranged sequentially, in the case of one bit, the vector of the candidate block at the beginning is selected in the case of 0 and that the vector of the next candidate block is selected in the case of 1. For example, in the case that the blocks A and B, or A, B, and S are incorporated, the order of arrangement of candidate blocks is such that A and B, or A, B, and S are arranged in this order. Then, when identical vectors are included, it is excluded. Then, two blocks at the beginning are arranged sequentially and compared.

The following description is given for a case that the selected vector is expressed in 2 bits. It is assumed that candidate blocks are four blocks A, B, S, and C shown in 302 in the figure. Similarly to the above-mentioned example, a vector nearest to the vector of the encoding target block is selected and then the codes are transmitted in the form of A:00, B:01, C:10, and S:11 or the like. For example, when any one of these is to be excluded from the candidate blocks, the order of the blocks is advanced. The number of bits expressing the selected vector may be changed frame by frame and block by block. In this case, a flag indicating the switching is transmitted separately.

FIG. 11 shows an example of the method of describing the code of the selected vector. The candidate block number of the encoding target block immediately preceding the present one is denoted by P. The number of candidate blocks is denoted by N. The candidate block number of the present encoding target block is denoted by X. When the candidate block number of the present encoding target block is P, 0 is adopted as the code C. Otherwise, 1 is outputted first and then (X−P−1) % N is outputted next. In reverse, when the code C is 0, the candidate block number X of the present encoding target block is the same as the candidate block number P of the immediately preceding one. Instead, in a case that the beginning bit of the code C is 1, when the remaining code where the beginning bit has been removed is denoted by C^, X=(P+C^+1)% N holds. According to this approach, the amount of codes is shortened when the same candidate block number is selected successively.

Here, the processing of Step 506 to Step 509 is executed by the adaptive PMV selection section 106.

Then, at Step 510, PMV calculation and vector encoding are performed. Here, PMV selection is not performed and PMV calculation is performed by ordinary median arithmetic operation. In this method, median arithmetic operation is performed on the individual components of the vector of the left A, the upper B, the upper right C, or the upper left D so that a PMV is determined. After the PMV is determined, a differential vector relative to the vector of the encoding target block is calculated and encoded. The processing of Step 510 is executed by the PMV prediction coding section 107.

At Step 511, motion prediction is performed for each inter prediction mode, then a residual component is acquired for the pixels of the encoding block, and then DCT transformation processing, quantization processing, and entropy encoding processing are performed on the residual component so that encoded data is calculated. The above-mentioned processing included in Step 511 is executed by the DCT transformation section 108, the quantization section 109, and the entropy encoding section 110. Further, entropy decoding processing, inverse quantization, and inverse DCT transformation processing are performed on the encoded data so that a decoded image is generated. Then, the encoded data and the decoded image are outputted. The above-mentioned processing included in Step 511 is performed by the inverse quantization section 111 and the inverse DCT transformation section 112.

Then, at Step 512, in accordance with the processing result of Step 503 and Step 511, the image coding results in the individual encoding modes are compared with each other so that an encoding mode to be outputted for the block is determined. The processing of Step 512 is executed by the mode selection section 113.

Then, at Step 513, the encoded data in the encoding mode selected at Step 512 is outputted as an encoded stream. The processing of Step 513 is executed by the data output section 114.

The encoding processing according to Embodiment 1 is performed as described above.

According to the image encoding device and the image encoding method according to Embodiment 1 described above, inter prediction is achieved that realizes a higher precision and a smaller amount of codes than existing encoding methods. This realizes an image encoding device and an image encoding method having a higher compression efficiency than existing methods.

Further, the image encoding device and the image encoding method according to Embodiment 1 are applicable to a recording device, a portable phone, a digital camera, and the like employing them.

According to the image encoding device and the image encoding method according to Embodiment 1 described above, the amount of codes of the encoded data is reduced and degradation in the image quality of the decoded image obtained when the encoded data is decoded is avoided. That is, a high compression ratio and a more satisfactory image quality are realized.

Embodiment 2

Next, FIG. 2 shows an example of a block diagram of an image decoding device according to Embodiment 2.

The image decoding device of the present embodiment includes a stream analyzing section 201, a mode determination section 202, a coefficient analyzing section 203, an intra prediction synthesizing section 204, an adaptive PMV selection decoding section 205, a motion prediction synthesizing section 206, an inverse quantization section 207, an inverse DCT transformation section 208, a decoded image memory 209, and an image output section 210.

The operation of the individual components of the image decoding device is described below in detail. Here, the operation of the individual components of the image decoding device may be, for example, of autonomous operation of the individual components as described below. Further, for example, the operation may be implemented by cooperation between a control section of a computer and software stored in a storage section.

First, the stream analyzing section 201 analyzes an inputted encoded stream. Here, the stream analyzing section 201 performs also data extraction processing from the packet and information acquisition processing for various kinds of headers and flags. Further, processing of each block is performed.

Further, at that time, the encoded stream inputted to the stream analyzing section 201 is an encoded stream generated by the image encoding device and the image encoding method according to Embodiment 1. The method of generation has been described in Embodiment 1. Thus, description thereof is omitted. An encoded stream read from a data recording medium shown in Embodiment 3 may be employed. The method of recording is described later.

Then, for each block, the mode determination section 202 distinguishes the encoding mode specified by a flag or the like. In the subsequent decoding processing, processing corresponding to the encoding mode of the discriminated result is performed. Processing for each encoding mode is described below.

First, when the encoding mode is of intra encoding, the intra prediction synthesizing section 204 performs intra prediction and synthesis of a predicted image. This method may be of a conventional method. Here, the intra prediction synthesizing section 204 outputs the synthesized predicted image.

When the encoding mode is of encoding by inter prediction for inter-frame processing, motion prediction and synthesis of a predicted image are performed. First, the adaptive PMV selection decoding section 205 adaptively selects a PMV and then combines this with a decoded differential vector so as to restore a motion vector. As for the method of PMV selection, the encoder and the decoder operate and select the same PMV. Thus, a method similar to that described in Embodiment 1 is employed.

Then, by using the restored motion vector, the motion prediction synthesizing section 206 performs motion prediction on the pixels within a block by using a reference frame. Here, the motion prediction synthesizing section 206 outputs a synthesized predicted image.

On the other hand, the coefficient analyzing section 203 analyzes the encoded data of each macro block contained in the inputted encoded stream, and then outputs the encoded data of a residual component. At that time, processing is performed in correspondence to the encoding mode of the discriminated result of the mode determination section 202.

The inverse quantization section 207 performs inverse quantization processing on the encoded data, and then transmits the result to the inverse DCT transformation section 208. The inverse DCT transformation section 208 performs inverse DCT transformation on the inverse-quantized coefficients so as to restore the residual component.

The above-mentioned restored residual component of each encoding mode is added to the predicted image outputted from the intra prediction synthesizing section 204 or the motion prediction synthesizing section 206 so that the decoded image is restored and then stored into the decoded image memory 209. The decoded image memory 209 stores the information of a frame presently under decoding and the information of frames decoded in the past. This information is referred to by the intra prediction synthesizing section 204 or the motion prediction synthesizing section 206.

The image decoded at the last is outputted by the image output section 210, and then decoding of the image is performed.

Next, the flow of the image decoding method employed in the image decoding device according to Embodiment 2 is described below with reference to FIG. 6.

First, at Step 601, an encoded stream serving as a decoding target is acquired. Then, at Step 602, the encoding mode flag and the encoded data contained in the encoded stream acquired at Step 601 are analyzed. These Step 601 and Step 602 are executed by the stream analyzing section 201.

Then, at Step 603, by using the encoding mode flag analyzed at Step 602, the encoding mode is determined for one encoding unit (such as a block unit and a pixel unit) contained in the encoded data. Here, in the case of intra encoding mode, the procedure goes to Step 604. In the case of inter encoding mode, the procedure goes to Step 605. This Step 603 is executed by the mode determination section 202.

At Step 604, intra prediction is performed in accordance with the method specified in the encoding mode. At that time, an existing intra prediction method may be employed. This Step 604 is executed by the intra prediction synthesizing section 204.

At Step 605, in accordance with various kinds of conditions in each frame and the information of the flag, it is determined whether PMV selection is to be performed on the frame. As for the determination of whether the PMV selection is to be performed frame by frame, the encoder and the decoder operate and perform the same processing. Thus, a method similar to that described in Embodiment 1 is employed. When PMV selection is not to be performed, the procedure goes to Step 609. Otherwise, the procedure goes to Step 606. At Step 606, in accordance with the encoding mode, various kinds of conditions in each block, and the information of the flag, it is determined whether PMV selection is to be performed on the block. As for the determination of whether the PMV selection is to be performed block by block, the encoder and the decoder operate and perform the same processing. Thus, a method similar to that described in Embodiment 1 is employed. When PMV selection is not to be performed, the procedure goes to Step 609. Otherwise, the procedure goes to Step 607.

At Step 607, adjustment of the PMV candidate blocks is performed. Here, which block is to be included into the candidate blocks and which block is not to be included are determined in accordance with the conditions. In the adjustment of the PMV candidate blocks, the encoder and the decoder operate and perform the same processing. Thus, a method similar to that described in Embodiment 1 is employed.

At Step 608, PMV selection and vector decoding are performed. As for the method of PMV selection, the encoder and the decoder operate and perform the same processing. Thus, a method similar to that described in Embodiment 1 is employed. In the decoding of the vector, the PMV and the decoded differential vector are combined with each other so that the motion vector of the encoding target block is restored.

Then, at Step 609, PMV calculation and vector decoding are performed. As for the method of PMV calculation, the encoder and the decoder operate and perform the same processing. Thus, a method similar to that described in Embodiment 1 is employed. In the decoding of the vector, the PMV and the decoded differential vector are combined with each other so that the motion vector of the encoding target block is restored. These Step 605, Step 606, Step 607, Step 608, and Step 609 are executed by the adaptive PMV selection decoding section 205.

At Step 610, by using the restored vector and the reference frame, inter prediction is performed so that a predicted image is synthesized. This processing is achieved when in response to the determined encoding mode, the intra prediction synthesizing section 204 and the motion prediction synthesizing section 206 of the image decoding device in FIG. 2 perform synthesizing processing for a predicted image respectively in the case of a corresponding encoding mode. This Step 610 is executed by the motion prediction synthesizing section 206.

At Step 611, the predicted image and the residual component are combined with each other so that a decoded image is generated. First, the encoded data is analyzed. Then, inverse quantization processing and inverse DCT transformation processing are performed on the encoded data. Then, decoding of the residual component is performed for one encoding unit. Then, the predicted image is combined with the result so that a decoded image is generated and stored into the memory. At last, at Step 612, the generated decoded image is outputted. This processing of Step 611 is executed by the coefficient analyzing section 203, the inverse quantization section 207, the inverse DCT transformation section 208, the decoded image memory 209, and the image output section 210.

Here, also in the present embodiment, in addition to the examples given above, an encoded stream whose encoding mode is set forth in a subdivided manner, for example, by adopting as a parameter the size or the like of the block used in the encoding mode may be employed as a decoding target stream.

According to the image encoding device and the image decoding method according to Embodiment 2 described above, inter prediction is achieved that realizes a higher precision and a smaller amount of codes than existing decoding methods. This realizes an image decoding device and an image decoding method having a higher compression efficiency than existing methods.

Further, the image decoding device and the image decoding method according to Embodiment 2 are applicable to a reproducing device, a portable phone, a digital camera, and the like employing them.

According to the image decoding device and the image decoding method according to Embodiment 2 described above, encoded data composed of a small amount of codes is decoded in a higher image quality.

Embodiment 3

Next, FIG. 7 shows a data recording medium storing an encoded stream generated by an image encoding device or an image encoding method according to Embodiment 1.

The encoded stream according to the present embodiment is an encoded stream generated by the image encoding device or the image encoding method according to Embodiment 1. The method of generation has been described in Embodiment 1. Thus, description thereof is omitted.

Here, the encoded stream according to the present embodiment is recorded as a data sequence 702 on a data recording medium 701. The data sequence 702 is recorded as an encoded stream according to a predetermined syntax. The following description is given for a case that a part of H.264/AVC standard is modified.

First, in H.264/AVC, a stream is constructed from a sequence parameter set 703, a picture parameter set 704, and slices 705, 706, and 707. The following description is given for a case that one slice stores one image (one picture).

In the inside of each slice, information 708 concerning each block is contained. In the inside of the information 708 concerning the block, a region is present for recording the encoding mode for each block. This is referred to as an encoding mode flag 709.

According to the data recording medium according to Embodiment 3 described above, recording is achieved in the form of an encoded stream having a higher compression efficiency than existing methods. This permits recording of a larger number of images.

Here, any ones of the above-mentioned embodiments of methods and figures may be combined.

REFERENCE SIGN LIST

101 . . . block dividing section, 102 . . . prediction error calculation section, 103 . . . decoded image memory, 104 . . . intra prediction section, 105 . . . motion search section, 106 . . . adaptive PMV selection section, 107 . . . PMV prediction encoding section, 108 . . . DCT transformation section, 109 . . . quantization section, 110 . . . entropy encoding section, 111 . . . inverse quantization section, 112 . . . inverse DCT transformation section, 113 . . . mode selection section, 114 . . . data output section, 120 . . . inter prediction section, 201 . . . stream analyzing section, 202 . . . mode determination section, 203 . . . coefficient analyzing section, 204 Intra prediction synthesizing section, 205 . . . adaptive PMV selection decoding section, 206 motion prediction synthesizing section, 207 . . . inverse quantization section, 208 . . . inverse DCT transformation section, 209 . . . decoded image memory, 210 . . . image output section

The invention claimed is:

1. An image decoding method for decoding a coded stream including an encoded picture, comprising:
   a first step for determining a motion vector of a target block to be decoded, by selecting a motion vector among motion vectors of candidate blocks including adjacent blocks adjacent to the target block to be decoded, according to coding mode information obtained from the coded stream;
   a second step for generating a prediction image by using the motion vector of the target block to be decoded and a reference picture; and
   a third step for generating a decoded image of the target block to be decoded by combining the prediction image with residual components which are decoded from the coded stream,
   wherein, in the motion vector selecting step of the first step, candidate blocks are selected among first blocks adjacent to the target block to be decoded in the same frame as the target block to be decoded and a second block located at the same position of the target block to be decoded in a different frame from the target block to be decoded,
   wherein, in the motion vector selecting step of the first step,
   performing the steps of:
   excluding a block located on an upper side of the target block to be decoded in the first blocks from the candidate blocks based on a comparing process showing that the block located on the upper side of the target block to be decoded has the same motion vector as a block located on a left side of the target block in the first blocks;
   excluding a non-referenceable block in the first blocks from the candidate;
   blocks in the case that the first blocks have a non-referenceable block; and
   adding another block or blocks to the candidate blocks, wherein the number of blocks to be added is changed based on the number of blocks that have been selected as candidate blocks,
   wherein if there are a plurality of blocks located on the upper side of the target block, a motion vector of one block among the blocks located on the upper side of the target block is selected as a motion vector to be a target of the comparing process before the comparing process in the first step.

2. An image decoding method for decoding a coded stream including an encoded picture, the method comprising the steps of:
   determining a motion vector of a target block to be decoded, by selecting a motion vector among motion vectors of candidate blocks including adjacent blocks adjacent to the target block to be decoded, according to coding mode information obtained from the coded stream;
   generating a prediction image by using the motion vector of the target block to be decoded and a reference picture; and
   generating a decoded image of the target block to be decoded by combining the prediction image with residual components which are decoded from the coded stream,
   wherein, in the motion vector selecting step of the motion vector determining step candidate blocks are selected among first blocks adjacent to the target block to be decoded in the same frame as the target block to be decoded and a second block located at the same position of the target block to be decoded in a different frame from the target block to be decoded,
   wherein, the motion vector determining step, by selecting a motion vector among motion vectors of candidate blocks including adjacent blocks adjacent to the target block to be decoded, according to coding mode information obtained from the coded stream,
   further comprises the steps of:
   excluding a block located on an upper side of the target block to be decoded in the first blocks from the candidate blocks based on a comparing process showing that the block located on the upper side of the target block to be decoded has the same motion vector as a block located on a left side of the target block in the first blocks;
   excluding a non-referenceable block in the first blocks from the candidate;
   blocks in the case that the first blocks have a non-referenceable block; and adding another block or blocks to the candidate blocks, wherein the number of blocks to be added is changed based on the number of blocks that have been selected as candidate blocks, wherein if there are a plurality of blocks located on the upper side of the target block, a motion vector of one block among the blocks located on the upper side of the target block is selected as a motion vector to be a target of the comparing process before the comparing process in the motion vector determining step.

* * * * *